United States Patent
Su et al.

(10) Patent No.: US 9,568,314 B2
(45) Date of Patent: Feb. 14, 2017

(54) BELL-SHAPED VIBRATOR TYPE ANGULAR RATE GYRO

(71) Applicants: Beijing Information Science & Technology University, Haidian District, Beijing (CN); Beijing Institute of Technology, Haidian District, Beijing (CN)

(72) Inventors: Zhong Su, Beijing (CN); MengYin Fu, Beijing (CN); Qing Li, Beijing (CN); ZhiHong Deng, Beijing (CN); JunFang Fan, Beijing (CN); Ning Liu, Beijing (CN); Hong Liu, Beijing (CN)

(73) Assignees: Beijing Information Science & Technology University, Beijing (CN); Beijing Institute of Technology, Beijing (CN)

( * ) Notice: Subject to any disclaimer, the term of this patent is extended or adjusted under 35 U.S.C. 154(b) by 573 days.

(21) Appl. No.: 14/016,154

(22) Filed: Sep. 2, 2013

(65) Prior Publication Data
US 2014/0360266 A1     Dec. 11, 2014

(30) Foreign Application Priority Data
Jun. 5, 2013 (CN) .......................... 2013 1 0220902

(51) Int. Cl.
*G01C 19/56* (2012.01)
*G01C 19/5691* (2012.01)

(52) U.S. Cl.
CPC ................................. *G01C 19/5691* (2013.01)

(58) Field of Classification Search
None
See application file for complete search history.

(56) References Cited

U.S. PATENT DOCUMENTS 4,217,787 A * 8/1980 Liebing ................. G01C 19/04
                                                              74/5.6 D
4,434,347 A * 2/1984 Kurtz ................... H01L 21/4825
                                                              219/56.21
(Continued)

FOREIGN PATENT DOCUMENTS

CN     101968359 A  *  2/2011
CN     102254058 A  *  11/2011

OTHER PUBLICATIONS

Machine Translation of CN 101968359 A, Feb. 9, 2011, Fengping Zhang.*
Machine Translation of CN 102254058 A, Nov. 23, 2011, Hong Liu.*

*Primary Examiner* — Helen Kwok
(74) *Attorney, Agent, or Firm* — James L. Haynes

(57) ABSTRACT

The present invention provides an angular rate gyro in which a bell-shaped vibrator having nonuniform thickness, axially symmetric and multi curved surface combined structural features is used as a sensitive element. The angular rate gyro is composed of the bell-shaped vibrator, a vibrator fixing shaft, a vibrator base, an airtight hood, a housing and a circuit system. The bell-shaped vibrator includes a bell shoulder having a hemispheric shell structure, a bell waist having a cylindrical shell structure and a bell lip having a hyperboloidal shell structure. The bell-shaped vibrator, the base and a central shaft are mechanically and fixedly connected together to be formed into an integral core having sensitive gyratory effect. A circuit system is used to control vibration forms of the bell-shaped vibrator, perform signal processing and solve the applied angular rate.

13 Claims, 9 Drawing Sheets

(56) References Cited

U.S. PATENT DOCUMENTS

| | | | | |
|---|---|---|---|---|
| 4,951,508 A * | 8/1990 | Loper, Jr. | ............ | G01C 19/5691 |
| | | | | 73/1.84 |
| 5,345,822 A * | 9/1994 | Nakamura | ......... | G01C 19/5663 |
| | | | | 310/316.01 |
| 6,272,925 B1 * | 8/2001 | Watson | .............. | G01C 19/5642 |
| | | | | 73/504.12 |
| 6,474,161 B1 * | 11/2002 | Jeanroy | .............. | G01C 19/5691 |
| | | | | 73/504.13 |
| 7,694,595 B2 * | 4/2010 | James | .................... | G01C 19/56 |
| | | | | 74/1 SS |
| 7,839,059 B2 * | 11/2010 | Choi | .................. | G01C 19/5691 |
| | | | | 310/348 |
| 2003/0010120 A1 * | 1/2003 | Jeanroy | .............. | G01C 19/5691 |
| | | | | 73/504.02 |
| 2012/0227490 A1 * | 9/2012 | Vandebeuque | ........ | G01C 19/56 |
| | | | | 73/504.12 |
| 2012/0227493 A1 * | 9/2012 | Vandebeuque | ...... | B23K 1/0016 |
| | | | | 73/504.18 |
| 2012/0227497 A1 * | 9/2012 | Eudier | ............... | G01C 19/5691 |
| | | | | 73/579 |
| 2012/0297875 A1 * | 11/2012 | Jeanroy | .............. | G01C 19/5691 |
| | | | | 73/504.12 |

* cited by examiner

BELL-SHAPED VIBRATOR TYPE ANGULAR RATE GYRO

FIELD OF THE INVENTION

The present invention pertains to a technical field of angular rate gyros, and particularly relates to a novel bell-shaped vibrator type angular rate gyro.

BACKGROUND OF THE INVENTION

As an inertial device with which a sensitive carrier makes angular movement, a gyro is a key device used for inertial navigation or guidance. A vibratory gyro based on the Coriolis force theory has all of the necessary merits, becomes more and more important in the field of inertial technology, and has been widely used as a new-generation inertial instrument. Promoted by technology development and market demand, various vibratory gyros have arisen successively. Currently, the most widely used vibratory gyros may be divided in terms of structure into a shell vibratory gyro, a ring vibratory gyro, a disk vibratory gyro and a beam vibratory gyro.

These gyros detect an applied angular rate by precession of vibration forms of a sensitive standing wave using the Coriolis effect. Differences in structure cause their advantages and disadvantages to be obvious. Specifically, as for the ring vibratory gyro, since the design for its supporting structure is complicated and an axial direction of a vibratory standing wave is hard to control so that an error in a direction perpendicular to the axial direction is readily introduced, such structured gyro is low in accuracy and thus is widely used as a MEMS gyro; balance between the supporting structure and a vibrating ring is ensured by virtue of micro mechanical machining, but the ring vibratory gyro has a poor capability to resist against impact. As for the disk vibratory gyro, since its capability to resist against impact is poor and planarity of a disk is hard to guarantee, development thereof encounters a bottleneck and has been turned to a micro mechanical stage in which it approaches the ring vibratory gyro by disk etching. As for the beam vibratory gyro, it mainly has a tuning fork type and a vibrating beam type, is poor in its capability to resist against impact and is low in accuracy, and thus is also widely used as a MEMS gyro. As for the shell vibratory gyro, it is presently the most accurate vibratory gyro, is typically in the forms of a hemispheric resonant gyro and a cylindrical vibratory gyro, and is widely used in respective fields. However, the existing gyros of this kind are poor in their capability to resist against impact, expensive in cost, and complicated to manufacture, thus they cannot meet the requirements for application in the field of high-impact and mid or low-precision angular rate measurement. Though the cylindrical vibratory gyro employs a method of piezoelectric excitation and piezoelectric detection, it has a low quality factor and a poor impact resistant capability due to restrictions caused by its own structure.

Chinese patent granted as No. ZL201010215745.1 and entitled "BELL-SHAPED VIBRATOR TYPE ANGULAR RATE GYRO" provides a bell-shaped vibrator type angular rate gyro which is a vibratory gyro based on the Coriolis force theory. In this patent, a bell-shaped harmonic oscillator made of a molten quartz material is used as a sensitive element, electrostatic excitation and capacitive detection are employed, and excitation electrodes are mounted on an outer cover of a vibrator shell so that difficulty of machining and mounting is increased. This bell-shaped vibrator type angular rate gyro can not bear high overload due to restriction of the material per se, and is higher in cost as compared with the bell-shaped vibrator type angular rate gyro of the present invention. Chinese patent granted as No. ZL201110117526.4 and entitled "METHOD FOR DESIGNING STRUCTURE OF BELL-SHAPED VIBRATOR TYPE ANGULAR RATE GYRO" provides a method for designing the structure of a bell-shaped vibrator type angular rate gyro. In the detailed description of this patent, the vibrator to be used is a bell-shaped vibrator like a round cup which is not subjected to multi curved surface combination and has a low quality factor. All the shell vibratory gyros available at present have a single curved surface structure in which a vibrator wall is a hemispheric or cylindrical structure without a change of curvature. The above bell-shaped vibrator type angular rate gyros adopt the idea of a curved edge to improve the stability of the vibration. However, the concrete curved structure uses natural curves which did not undergo accurate analysis, thereby limiting improvement of the quality factor to a certain extent. With regard to signal processing, the conventional bell-shaped gyros and hemispheric resonant gyros both employ electrostatic excitation and capacitive detection, and vibration forms thereof are subjected to feedback control by using the vibration forms detected by a capacitor, which causes reduction of band width of the entire system.

SUMMARY OF THE INVENTION

An object of the present invention is to provide a novel angular rate gyro which uses a bell-shaped vibrator having nonuniform thickness, axially symmetric and multi curved surface combined structural features as a sensitive element, i.e., a novel bell-shaped vibrator type angular rate gyro, so as to overcome defects of conventional gyros such as a poor capability to resist against overload, a low quality factor, strict machining process requirements and an expensive cost. The bell-shaped vibrator type angular rate gyro is a solid fluctuant gyro in which the applied angular rate is detected by the precession effect of a standing wave on a vibrator shell. A bell-shaped vibrator similar to a millimeter class Chinese bell serves as a kernel component of the gyro, vibration forms of the vibrator are controlled by excitation electrodes and detection electrodes on a vibrator wall so as to produce a specific standing wave, and the applied angular rate is detected by extracting the precession of the standing wave. The novel bell-shaped vibrator type angular rate gyro according to the present invention exhibits advantages such as lower cost, lower power consumption, longer service life and higher sensitivity as compared with the conventional solid vibratory gyros, has a simple structure and a strong capability to resist against impact, thus can be desirably applied to the field of the mid or low precision angular rate measurement.

In order to solve the above technical problem, the present invention employs the following technical solutions.

A novel bell-shaped vibrator type angular rate gyro includes a bell-shaped vibrator, a vibrator fixing shaft, a vibrator base, an airtight hood, a housing and a circuit system, wherein, the bell-shaped vibrator has a nonuniform thickness, axially symmetric and multi curved surface combined structure, and includes: a bell shoulder having a hemispheric shell structure; a bell waist having a cylindrical shell structure; and a bell lip having a hyperboloidal shell structure. Two excitation electrodes, two feedback electrodes, two detection electrodes and two damp control electrodes are evenly distributed on an outer wall of the bell waist of the vibrator, and there is a difference of 45° between every two adjacent electrodes. Specifically, the first excitation electrode is mounted to a position of 0° on the outer side of the bell waist of the bell-shaped vibrator, the second excitation electrode is mounted to a position of 180° on the outer side of the bell waist of the bell-shaped vibrator, the first feedback electrode is mounted to a position of 90° on the outer side of the bell waist, the second feedback electrode is mounted to a position of 270° on the outer side of the bell waist, the first detection electrode is mounted to a position of 45° on the outer side of the bell waist, the second detection electrode is mounted to a position of 225° on the outer side of the bell waist, the first damp control electrode is mounted to a position of 135° on the outer side of the bell waist, and the second damp control electrode is mounted to a position of 315° on the outer side of the bell waist. An isolating hole is provided between every two adjacent electrodes. Eight capacitor positive pole plates which correspond to the eight electrodes on the outer wall of the bell waist in an axial direction are evenly arranged on a bottom portion of an inner wall of the bell waist of the bell-shaped vibrator respectively. Specifically, a first capacitor positive pole plate is mounted to a position of 0° on the inner side of the bell waist, a second capacitor positive pole plate is mounted to a position of 45° on the inner side of the bell waist, a third capacitor positive pole plate is mounted to a position of 90° on the inner side of the bell waist, a fourth capacitor positive pole plate is mounted to a position of 135° on the inner side of the bell waist, a fifth capacitor positive pole plate is mounted to a position of 180° on the inner side of the bell waist, a sixth capacitor positive pole plate is mounted to a position of 225° on the inner side of the bell waist, a seventh capacitor positive pole plate is mounted to a position of 270° on the inner side of the bell waist, and an eighth capacitor positive pole plate is mounted to a position of 315° on the inner side of the bell waist. On a pole plate mounting surface of the vibrator fixing shaft are arranged eight capacitor negative pole plates corresponding to the eight capacitor positive pole plates on the inner side of the bell waist. Specifically, a first capacitor negative pole plate is mounted to a position of 0° on the pole plate mounting surface of the vibrator fixing shaft, a second capacitor negative pole plate is mounted to a position of 45° on the pole plate mounting surface of the vibrator fixing shaft, a third capacitor negative pole plate is mounted to a position of 90° on the pole plate mounting surface of the vibrator fixing shaft, a fourth capacitor negative pole plate is mounted to a position of 135° on the pole plate mounting surface of the vibrator fixing shaft, a fifth capacitor negative pole plate is mounted to a position of 180° on the pole plate mounting surface of the vibrator fixing shaft, a sixth capacitor negative pole plate is mounted to a position of 225° on the pole plate mounting surface of the vibrator fixing shaft, a seventh capacitor negative pole plate is mounted to a position of 270° on the pole plate mounting surface of the vibrator fixing shaft, and an eighth capacitor negative pole plate is mounted to a position of 315° on the pole plate mounting surface of the vibrator fixing shaft. Negative pole faces of the two excitation electrodes, the two feedback electrodes, the two detection electrodes and the two damp control electrodes are fixedly attached to the bell-shaped vibrator by means of a conductive adhesive, and positive pole faces thereof are connected with metal leading wire which are bonded to respective connecting holes in the vibrator base by welding. Eight pairs of capacitor pole plates are connected to respective connecting holes above a central shaft of the vibrator. The bell-shaped vibrator type angular rate gyro which has been assembled is sealed by the airtight hood, connected to an external circuit via connecting terminals, and connected to an integral housing via a mechanical mounting hole.

Compared with the prior art, the present invention has the following advantages.

(1) The vibrator of the present invention is designed to be a bell-shaped structure having nonuniform thickness, axially symmetric and multi curved surface combined structural features, which is apt for stable vibration. Compared with vibrators of other types, the bell-shaped vibrator of the present invention has a higher quality factor, higher structural strength, a higher sensitivity, and a stronger capability to resist against overload. The vibrator is made of a constant modulus alloy ($Ni_{43}CrTi$) which has perfect temperature characteristics and linearity, can be easily manufactured in mass production, and provides good capability to resist against impact for the bell-shaped vibrator type angular rate gyro.

(2) The core structure of the bell-shaped vibrator type angular rate gyro provided by the present invention is manufactured by modularization so that the cost is reduced, production efficiency is improved, a machining period is shortened, and the ratio of finished products is increased.

(3) The present invention controls vibration forms of the bell-shaped vibrator in a piezoelectric manner and detects the precession of the vibration forms using capacitor pole plates, so that the defects such as a high cost and difficulties of machining and assembling caused by the conventional bell-shaped vibrator type angular rate gyro employing electrostatic excitation are overcome, and a system delay caused by the conventional bell-shaped vibrator type angular rate gyro using the capacitor pole plates in vibration form control is eliminated.

(4) The bell-shaped vibrator type angular rate gyro of the present invention has a unique curve design to strengthen capability to resist against impact of an integral structure and increase the quality factor so that the vibrator can vibrate more durably and stably.

(5) In the bell-shaped vibrator type angular rate gyro of the present invention, one isolating hole is provided between every two adjacent electrodes to eradicate any possible disturbance between the adjacent electrodes.

DETAILED DESCRIPTION OF THE PREFERRED EMBODIMENTS

The bell-shaped vibrator type angular rate gyro of the present invention is a gyro in which the applied angular rate is detected by use of the precession effect of a standing wave on a vibrator shell. Since a bell-shaped vibrator is brought into a stable state of four-wave loop vibration under the action of excitation electrodes, the present invention allows for generation of a stable standing wave along a circumferential direction of the vibrator. The Coriolis force causes the standing wave to precess, and the applied angular rate is obtained by detecting vibrator displacement caused by torsional deformation of the bell-shaped vibrator.

The operating principle of the present invention is as follows.

Figure 5:
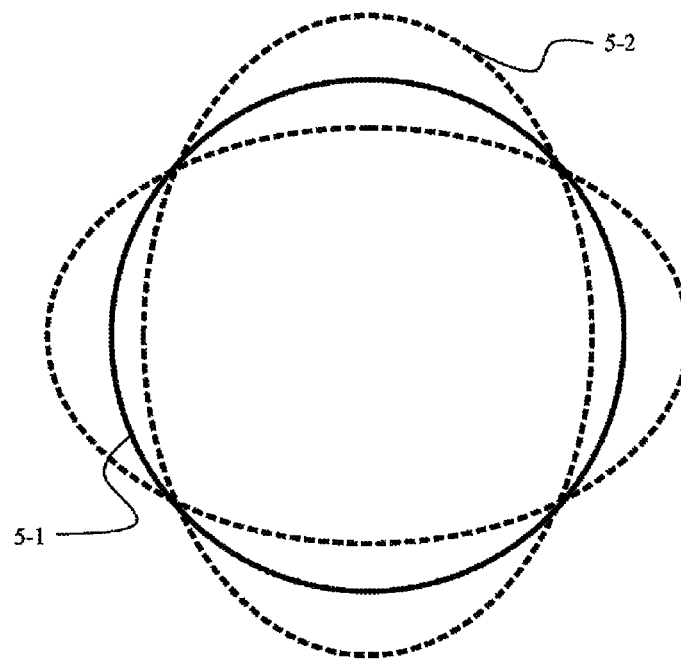
FIG. 5 is a view illustrating four-wave loop vibration of a standing wave.
Figure 6:
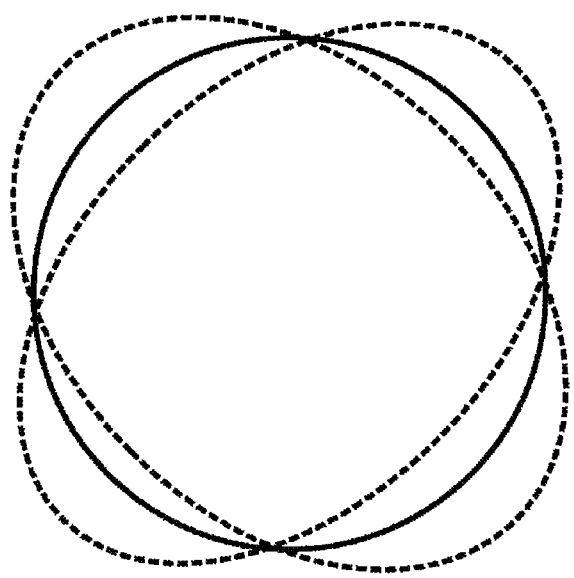
FIG. 6 is a schematic diagram of a detected mode of a standing wave of the vibrator.
Figure 7:
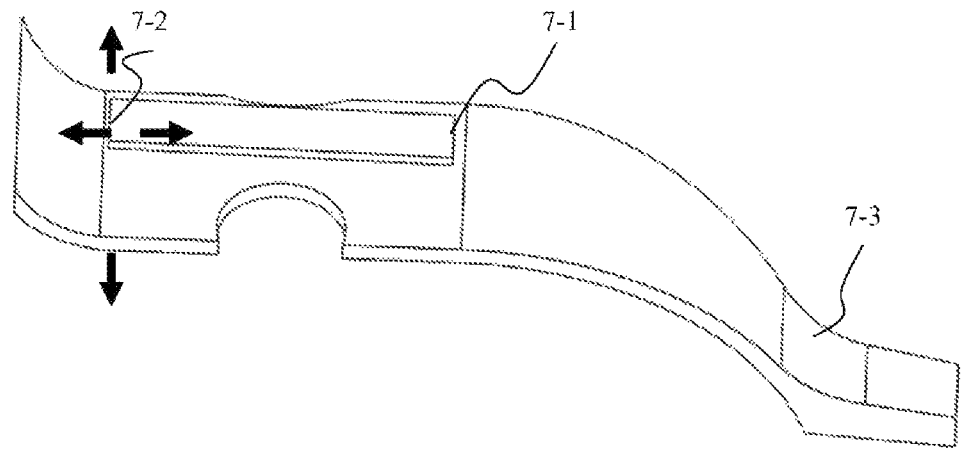
FIG. 7 is a schematic diagram of the generation of a stretching force and a bending force of a piezoelectric excitation unit.

A bell-shaped vibrator 1-1 has nonuniform thickness, axially symmetric and multi curved surface combined structural features, wherein the bell-shaped vibrator includes a bell shoulder 2-7 having a hemispheric shell structure, a bell waist 2-8 having a cylindrical shell structure and a bell lip 2-9 having a hyperboloidal shell structure, and these structures themselves have excellent stable characteristics of a standing wave. As shown in FIG. 5, the bell-shaped vibrator 1-1 is excited by a first excitation electrode 2-1 and a second excitation electrode 2-2 on an outer wall of the bell-shaped vibrator to produce four-wave loop vibration, that is, the bell-shaped vibrator 1-1 is operated in an excited mode. Further, as shown in FIG. 6, the bell-shaped vibrator 1-1 is also in a detected mode which differs from the excited mode by 45°. The two modes are coupled by the Coriolis force. Piezoelectric ceramics (PZT5A) which are polarized in a thickness direction are used as a material of the first excitation electrode 2-1 and the second excitation electrode 2-2. As shown in FIG. 7, when the first excitation electrode 2-1 and the second excitation electrode 2-2 are operated, a stretching force is produced. Since an electrode top 7-1 of the first excitation electrode 2-1 and the second excitation electrode 2-2 is close to a constrained end 7-3 of the bell-shaped vibrator while an electrode bottom 7-2 of the first excitation electrode 2-1 and the second excitation electrode 2-2 is away from the constrained end 7-3, a deviation is formed between the stretching forces in the electrode top 7-1 and the electrode bottom 7-2, which causes the stretching forces to be converted into a bending force for driving the vibrator, as shown in FIG. 7. In this way, the bell-shaped vibrator is excited to produce four-wave loop vibration through vibrations with the same amplitude, at the same frequency, and in the same phase of the first excitation electrode 2-1 and the second excitation electrode 2-2.

Figure 8:
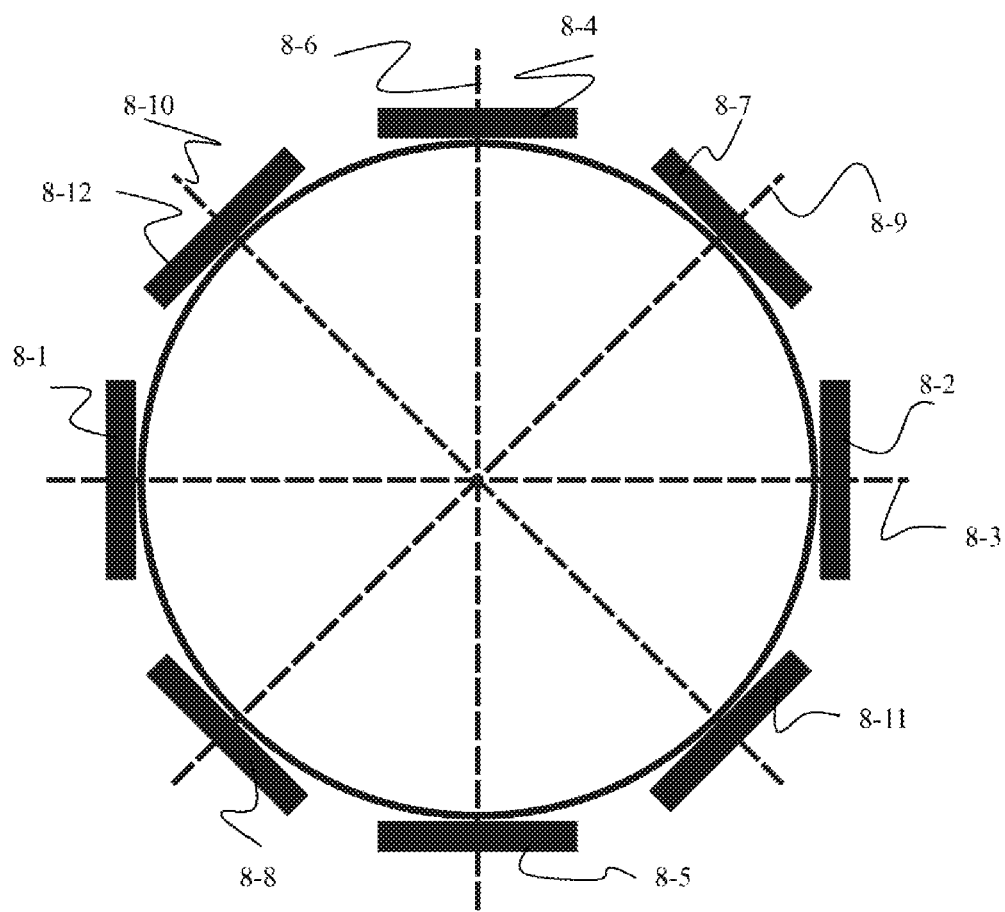
FIG. 8 is a schematic diagram of the standing wave on sections of the control electrodes.
Figure 9:
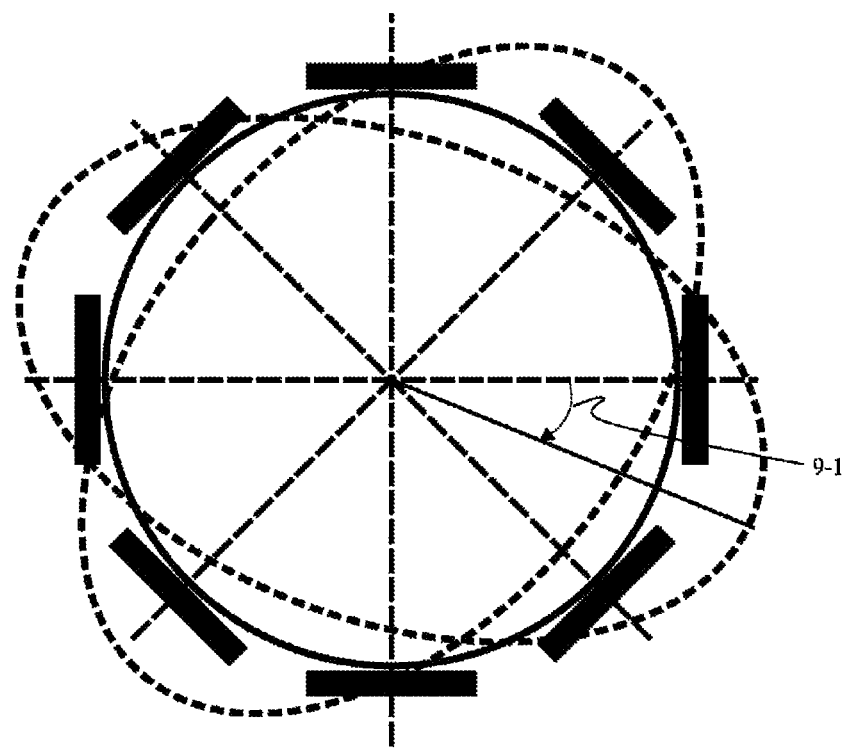
FIG. 9 is a diagram illustrating an effect of the precession of the standing wave.
Figure 10:
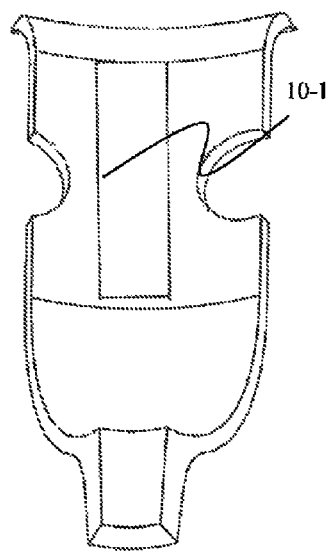
FIG. 10 is a diagram illustrating an effect of displacement of a pole plate.
Figure 11:
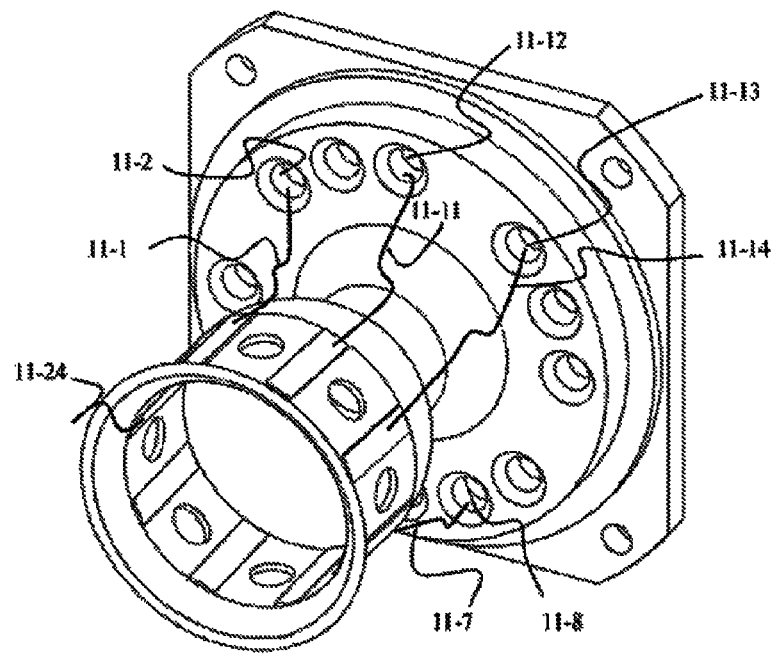
FIGS. 11(a) to 11(c) are schematic diagrams of connection relationships of the bell-shaped vibrator.
Figure 11:
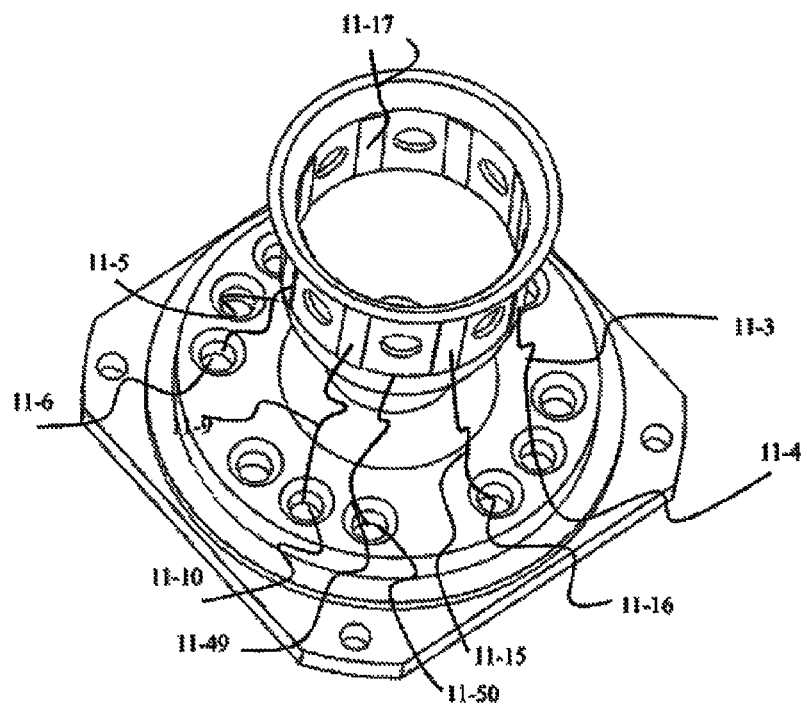
Figure 11:
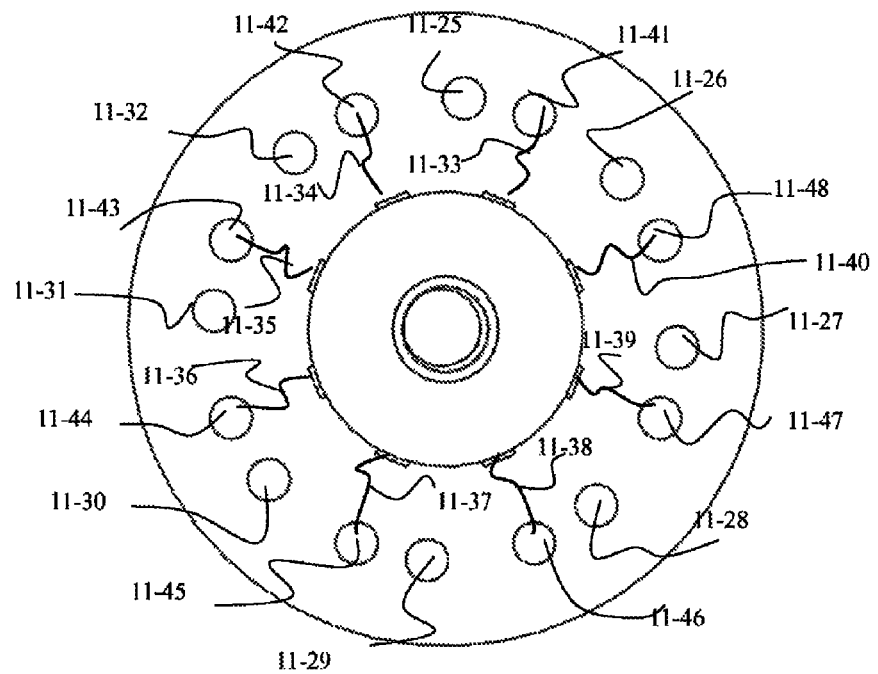

When the bell-shaped vibrator is operated in the four-wave loop vibration state, a standing wave is formed along a circumferential direction of the vibrator in a form as shown in FIG. 5, and a standing wave 5-2 is in the four-wave loop vibration state on a section 5-1 of the bell-shaped vibrator. All forms of a corresponding standing wave on sections of respective control electrodes are identical. The form of the corresponding standing wave on the section of the corresponding electrode is shown in FIG. 8. Specifically, a section 8-1 of the first excitation electrode 2-1 and a section 8-2 of the second excitation electrode 2-2 are arranged on a wave loop transverse axis 8-3, a section 8-4 of a first feedback electrode 2-3 and a section 8-5 of a second feedback electrode 2-4 are arranged on a wave loop longitudinal axis 8-6, a section 8-7 of a first detection electrode 2-5 and a section 8-8 of a second detection electrode 2-6 are arranged on a wave node transverse axis 8-9, and a section 8-11 of a first damp control electrode 2-10 and a section 8-12 of a second damp control electrode 2-11 are arranged on a wave node longitudinal axis 8-10. As shown in FIG. 9, when an applied angular rate causes a counterclockwise rotation around a symmetric axis of the bell-shaped vibrator, the standing wave takes precession in a reverse direction to produce a precession angle 9-1. The first feedback electrode 2-3, the second feedback electrode 2-4, the first detection electrode 2-5 and the second detection electrode 2-6 detect vibrating effect of the standing wave using piezoelectric effect, and control vibration forms of the bell-shaped vibrator. As shown in FIG. 10, the precession of the standing wave causes mass points in planes of capacitor pole plates to produce a displacement, thus a capacitor pole plate 10-1 on an inner wall of the bell-shaped vibrator will change. The displacement can be detected using eight pairs of capacitor pole plates together based on a directly proportional relationship between the displacement and the applied angular rate.

The present invention can be implemented as follows.

Figure 1:
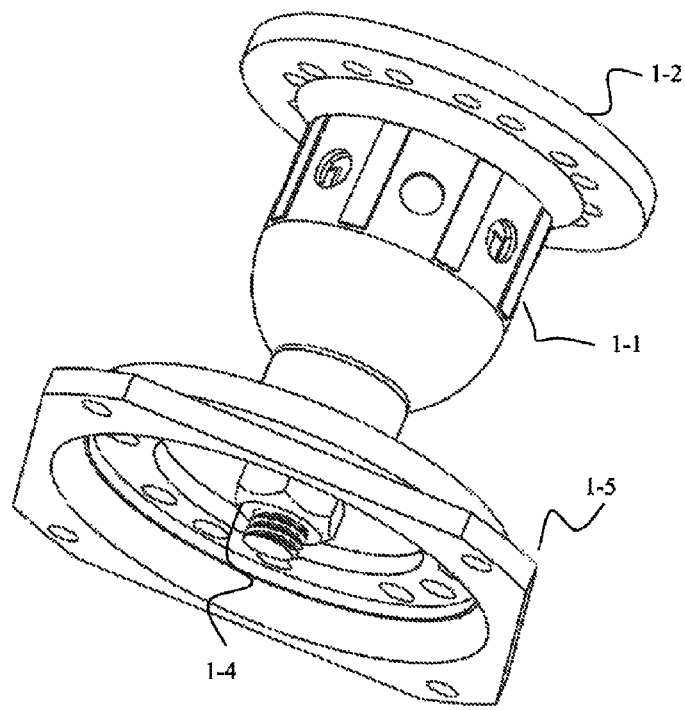
FIGS. 1(a) and 1(b) are design diagrams of an integral structure of a bell-shaped vibrator type angular rate gyro.
Figure 1:
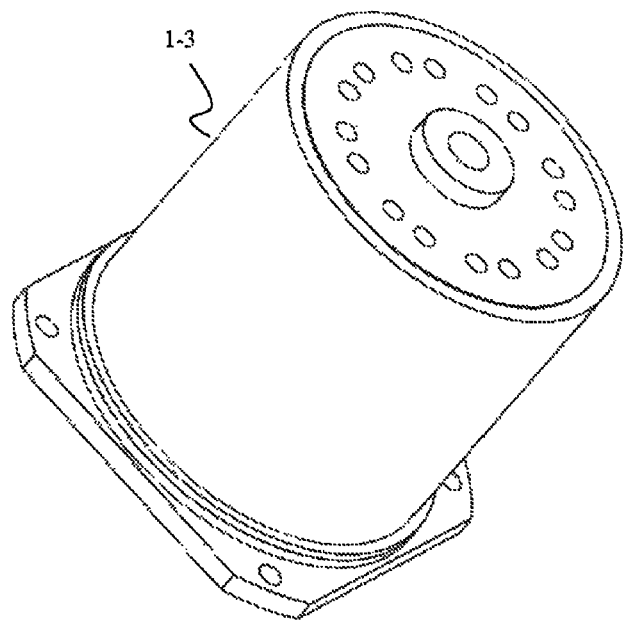
Figure 2:
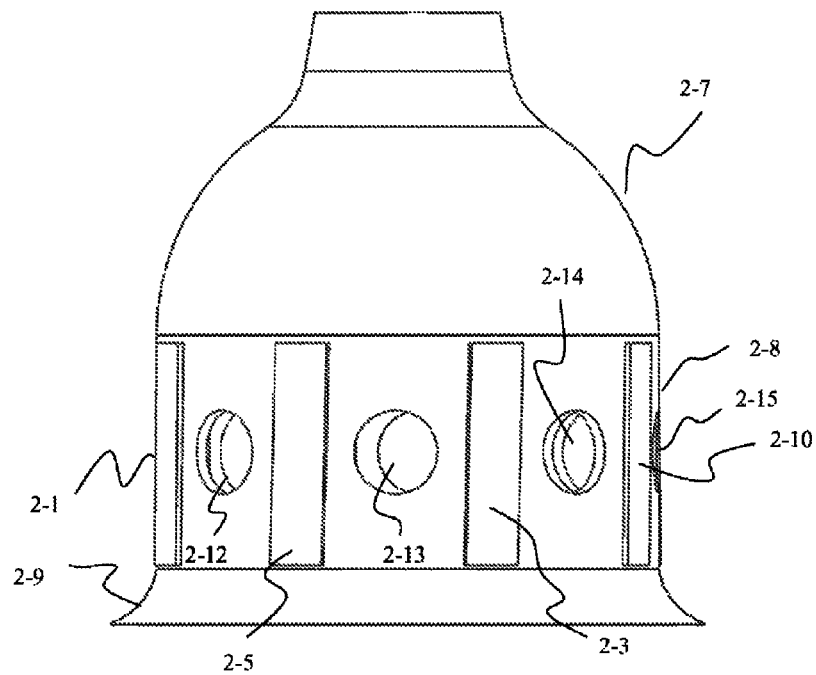
FIGS. 2(a) and 2(b) are mounting diagrams of control electrodes of a bell-shaped vibrator.
Figure 2:
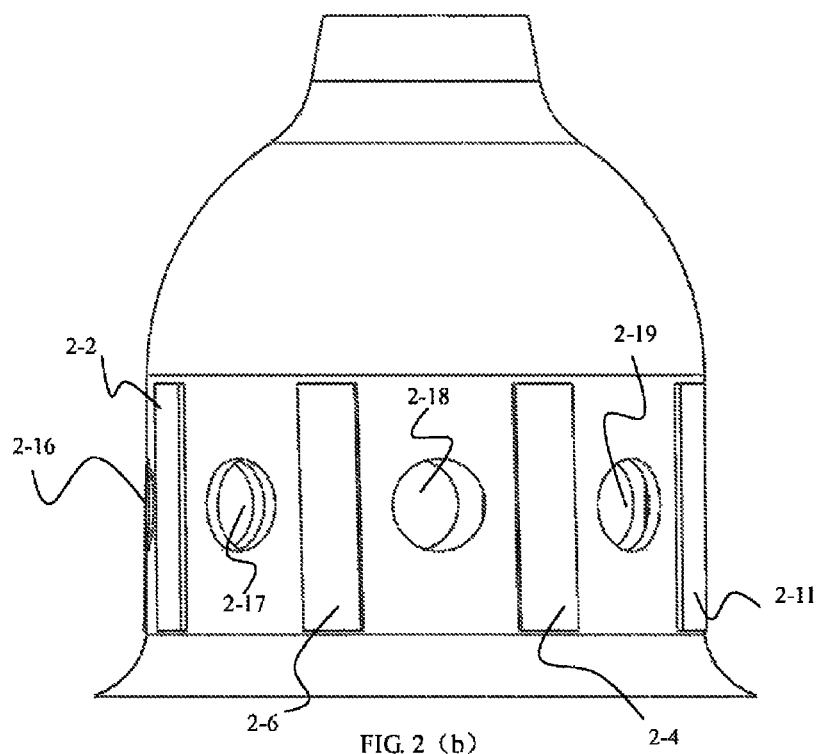
Figure 3:
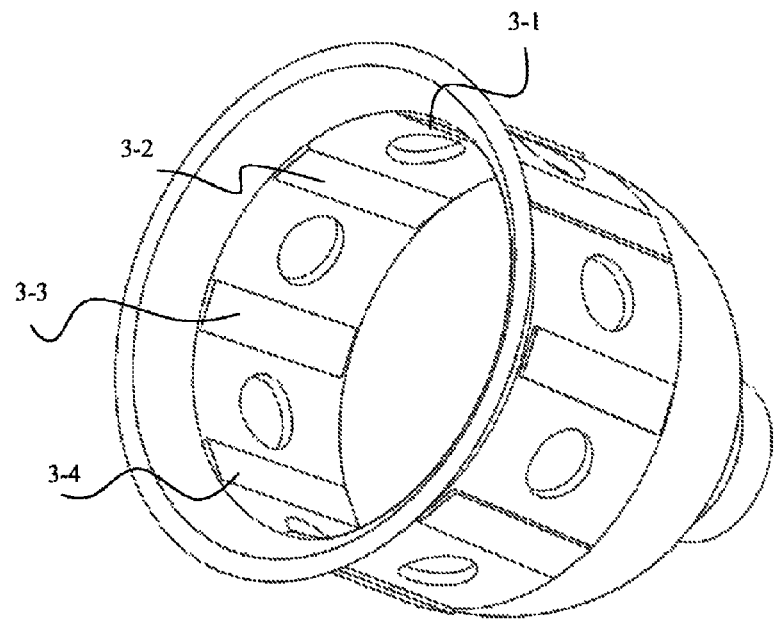
FIGS. 3(a) and 3(b) are mounting diagrams of capacitor pole plates of the bell-shaped vibrator.
Figure 3:
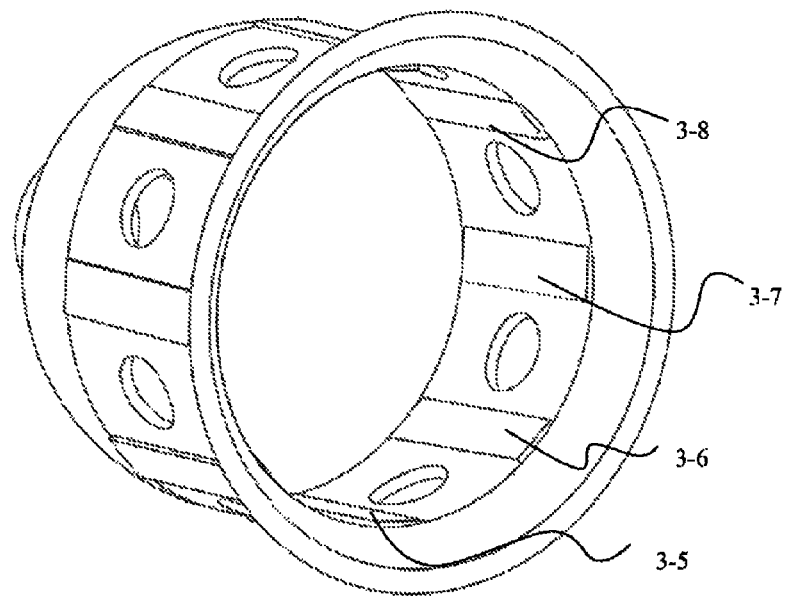
Figure 4:
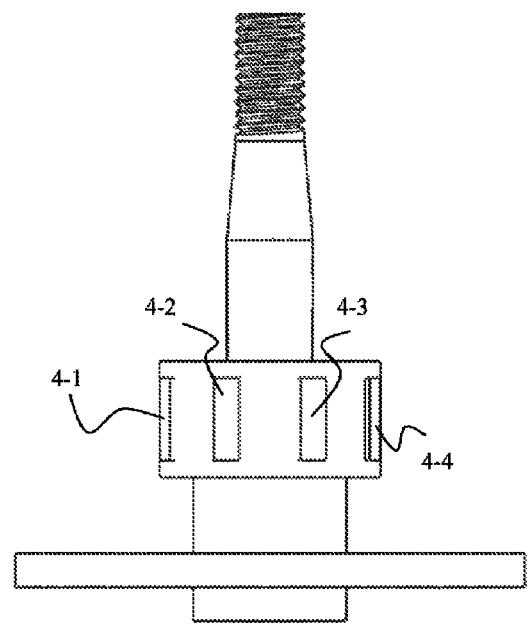
FIGS. 4(a) and 4(b) are mounting diagrams of capacitor pole plates of a vibrator fixing shaft.
Figure 4:
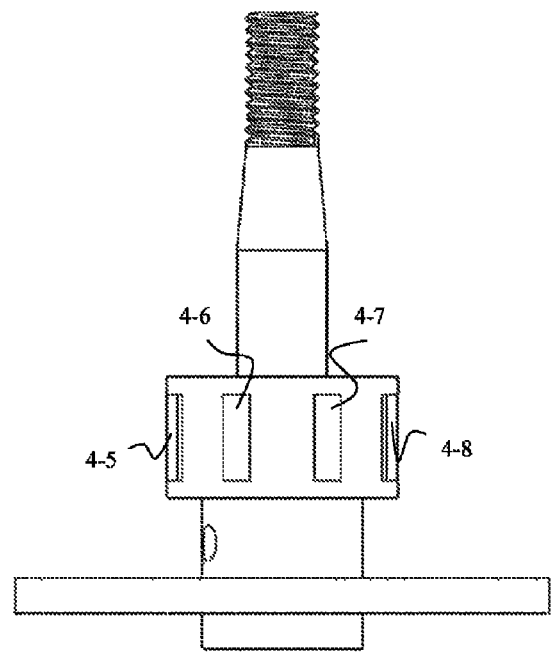
Figure 12:
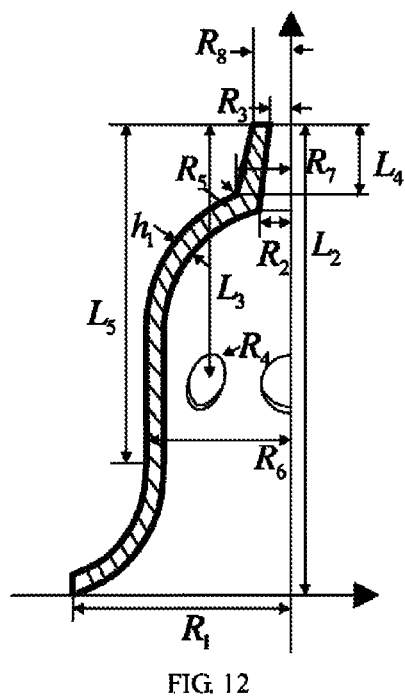
FIG. 12 is a schematic diagram of structural parameters of the bell-shaped vibrator.

As shown in FIG. 2, the bell-shaped vibrator 1-1 mainly comprises a curved surface structure of a body including the bell shoulder 2-7, the bell waist 2-8 and the bell lip 2-9. Wherein, the bell shoulder 2-7 has the hemispheric shell structure, the bell waist 2-8 has the cylindrical shell structure, and the bell lip 2-9 has the hyperboloidal shell structure. Specific structural design dimensions of the bell-shaped vibrator 1-1 are given in FIG. 12, wherein, $L_2$=22 mm, $L_3$=15.8 mm, $L_4$=3 mm, $L_5$=20 mm, $R_1$=10 mm, $R_2$=2 mm, $R_3$=1.5 mm, $R_4$=1.5 mm, $R_5$=4 mm, $R_6$=9 mm, $R_7$=2.5 mm, $R_8$=2.2 mm, $H_1$=0.5 mm. Concrete coordinate expressions of a corresponding curved surface structure can be derived from the set of parameters, and the difference of neighboring frequencies of the vibrator has a maximum value under these parameters. Under the above structural parameters, frequencies of the bell-shaped vibrator are distributed as follows: 1) 4447.2 Hz, 2) 4480.8 Hz, 3) 7273.3 Hz, 4) 7273.8 Hz, 5) 14535 Hz, 6) 19450 Hz, 7) 19451 Hz, and 8) 23283 Hz. The operating frequency is 7273.5 Hz.

The first excitation electrode 2-1 is mounted to a position of 0° on the outer side of the bell waist 2-8 of the bell-shaped vibrator 1-1, the second excitation electrode 2-2 is mounted to a position of 180° on the outer side of the bell waist 2-8 of the bell-shaped vibrator, the first feedback electrode 2-3 is mounted to a position of 90° on the outer side of the bell waist 2-8, the second feedback electrode 2-4 is mounted to a position of 270° on the outer side of the bell waist 2-8, the first detection electrode 2-5 is mounted to a position of 45° on the outer side of the bell waist 2-8, the second detection electrode 2-6 is mounted to a position of 225° on the outer side of the bell waist 2-8, the first damp control electrode 2-10 is mounted to a position of 135° on the outer side of the bell waist 2-8, and the second damp control electrode 2-11 is mounted to a position of 315° on the outer side of the bell waist 2-8. These electrodes are made of PZT5A which is polarized in a thickness direction and all have the following dimensions: a length of 8 mm, a width of 2 mm and a thickness of 0.2 mm. Respective electrodes are mounted to the outer wall of the bell-shaped vibrator by means of a conductive adhesive. Thus, the outer wall of the bell-shaped vibrator serves as a circuit GND end, and positive pole faces of the respective electrodes serve as signal input ends.

A first isolating hole 2-12 having a diameter of 2 mm is provided in a center line between the first excitation electrode 2-1 and the first detection electrode 2-5 (that is, at a position of 22.5° on the outer side of the bell waist 2-8), a second isolating hole 2-13 having a diameter of 2 mm is provided in a center line between the first detection electrode 2-5 and the first feedback electrode 2-3 (that is, at a position of 67.5° on the outer side of the bell waist 2-8), a third isolating hole 2-14 having a diameter of 2 mm is provided in a center line between the first feedback electrode 2-3 and the first damp control electrode 2-10 (that is, at a position of 112.5° on the outer side of the bell waist 2-8), a fourth isolating hole 2-15 having a diameter of 2 mm is provided in a center line between the first damp control electrode 2-10 and the second excitation electrode 2-2 (that is, at a position of 157.5° on the outer side of the bell waist 2-8), a fifth isolating hole 2-16 having a diameter of 2 mm is provided in a center line between the second excitation electrode 2-2 and the second detection electrode 2-6 (that is, at a position of 202.5° on the outer side of the bell waist 2-8), a sixth isolating hole 2-17 having a diameter of 2 mm is provided in a center line between the second detection electrode 2-6 and the second feedback electrode 2-4 (that is, at a position of 247.5° on the outer side of the bell waist 2-8), a seventh isolating hole 2-18 having a diameter of 2 mm is provided in a center line between the second feedback electrode 2-4 and the second damp control electrode 2-11 (that is, at a position of 292.5° on the outer side of the bell waist 2-8), and an eighth isolating hole 2-19 having a diameter of 2 mm is provided in a center line between the second damp control electrode 2-11 and the first excitation electrode 2-1 (that is, at a position of 337.5° on the outer side of the bell waist 2-8).

Eight capacitor positive pole plates which correspond to the eight electrodes on the outer wall of the bell waist 2-8 in an axial direction are evenly arranged on a bottom portion of the inner wall of the bell waist 2-8 of the bell-shaped vibrator 1-1 respectively. Specifically, a first capacitor positive pole plate 3-1 is mounted to a position of 0° on the inner side of the bell waist 2-8, a second capacitor positive pole plate 3-2 is mounted to a position of 45° on the inner side of the bell waist 2-8, a third capacitor positive pole plate 3-3 is mounted to a position of 90° on the inner side of the bell waist 2-8, a fourth capacitor positive pole plate 3-4 is mounted to a position of 135° on the inner side of the bell waist 2-8, a fifth capacitor positive pole plate 3-5 is mounted to a position of 180° on the inner side of the bell waist 2-8, a sixth capacitor positive pole plate 3-6 is mounted to a position of 225° on the inner side of the bell waist 2-8, a seventh capacitor positive pole plate 3-7 is mounted to a position of 270° on the inner side of the bell waist 2-8, and an eighth capacitor positive pole plate 3-8 is mounted to a position of 315° on the inner side of the bell waist 2-8.

On a pole plate mounting surface 4-9 of a vibrator fixing shaft 1-2 are arranged eight capacitor negative pole plates corresponding to the eight capacitor positive pole plates on the inner side of the bell waist 2-8. Specifically, a first capacitor negative pole plate 4-1 is mounted to a position of 0° on the pole plate mounting surface 4-9 of the vibrator fixing shaft 1-2, a second capacitor negative pole plate 4-2 is mounted to a position of 45° on the pole plate mounting surface 4-9 of the vibrator fixing shaft 1-2, a third capacitor negative pole plate 4-3 is mounted to a position of 90° on the pole plate mounting surface 4-9 of the vibrator fixing shaft 1-2, a fourth capacitor negative pole plate 4-4 is mounted to a position of 135° on the pole plate mounting surface 4-9 of the vibrator fixing shaft 1-2, a fifth capacitor negative pole plate 4-5 is mounted to a position of 180° on the pole plate mounting surface 4-9 of the vibrator fixing shaft 1-2, a sixth capacitor negative pole plate 4-6 is mounted to a position of 225° on the pole plate mounting surface 4-9 of the vibrator fixing shaft 1-2, a seventh capacitor negative pole plate 4-7 is mounted to a position of 270° on the pole plate mounting surface 4-9 of the vibrator fixing shaft 1-2, and an eighth capacitor negative pole plate 4-8 is mounted to a position of 315° on the pole plate mounting surface 4-9 of the vibrator fixing shaft 1-2. The capacitor positive pole plates and the capacitor negative pole plates are all made of a capacitor sheet material, and are pasted on the respective surfaces by means of an insulating glue.

The bell-shaped vibrator 1-1 on which the control electrodes and the capacitor pole plates are pasted is placed on a vibrator base 1-5, and an axis of 0° of the bell-shaped vibrator 1-1 coincides with an axis of 0° of the vibrator base 1-5. The bell-shaped vibrator 1-1 and the vibrator base 1-5 are connected together through the vibrator fixing shaft 1-2, and an axis of 0° of the vibrator fixing shaft 1-2 coincides with that of the bell-shaped vibrator 1-1 and the vibrator base 1-5. The bell-shaped vibrator 1-1, the vibrator fixing shaft 1-2 and the vibrator base 1-5 are fixed together through a fastening bolt 1-4. A leading wire 11-1 of the first excitation electrode 2-1 is connected to a connecting terminal in a first hole 11-2 of the vibrator base 1-5, a leading wire 11-3 of the second excitation electrode 2-2 is connected to a connecting terminal in a second hole 11-4 of the vibrator base 1-5, a leading wire 11-5 of the first detection electrode 2-5 is connected to a connecting terminal in a third hole 11-6 of the vibrator base 1-5, a leading wire 11-7 of the second detection electrode 2-6 is connected to a connecting terminal in a fourth hole 11-8 of the vibrator base 1-5, a leading wire 11-9 of the first feedback electrode 2-3 is connected to a connecting terminal in a fifth hole 11-10 of the vibrator base 1-5, a leading wire 11-11 of the second feedback electrode 2-4 is connected to a connecting terminal in a sixth hole 11-12 of the vibrator base 1-5, a leading wire 11-13 of the first damp control electrode 2-10 is connected to a connecting terminal in a seventh hole 11-14 of the vibrator base 1-5, and a leading wire 11-15 of the second damp control electrode 2-11 is connected to a connecting terminal in an eighth hole 11-16 of the vibrator base 1-5. Similarly, a leading wire 11-17 of the first capacitor positive pole plate 3-1 to a leading wire 11-24 of the eighth capacitor positive pole plate 3-8 are connected to a first hole 11-25 of the vibrator fixing shaft 1-2 to an eight hole 11-32 of the vibrator fixing shaft 1-2 respectively; and a leading wire 11-33 of the first capacitor negative pole plate 4-1 to a leading wire 11-40 of the eighth capacitor negative pole plate 4-8 are connected to a ninth hole 11-41 of the vibrator fixing shaft 1-2 to an eighteenth hole 11-48 of the vibrator fixing shaft 1-2 respectively. A system GND wire 11-49 is connected to the outer wall of the bell-shaped vibrator 1-1, and connected to a nineteenth hole 11-50 of the vibrator fixing shaft 1-2.

Excitation signals with the same amplitude, at the same frequency, and in the same phase are inputted by the first excitation electrode 2-1 and the second excitation electrode 2-2, and the inputted operating frequency is the inherent vibration frequency of the bell-shaped vibrator 1-1. The first feedback electrode 2-3 and the second feedback electrode 2-4 mainly acquire a resonance frequency of the bell-shaped vibrator and an amplitude fed back through vibration of the vibrator, carry out a differential computation, and form a control loop together with the first excitation electrode 2-1 and the second excitation electrode 2-2 to control the vibration frequency and the vibration amplitude of the bell-shaped vibrator. The first detection electrode 2-5 and the second detection electrode 2-6 carry out a differential computation, detect a deflection angle of the vibration forms of the bell-shaped vibrator, and form a control loop together with the first damp control electrode 2-10 and the second damp control electrode 2-11 to suppress deflection of the vibration forms of the bell-shaped vibrator. A system delay caused by using capacitor pole plates in controlling and detecting is eliminated by a control loop constituted by piezoelectric electrodes. The applied angular rate can be solved by acquiring information of respective leading wires through a corresponding circuit system and making a general signal analysis of the bell-shaped vibrator type angular rate gyro.

The novel bell-shaped vibrator type angular rate gyro according to the present invention exhibits advantages such as lower cost, lower power consumption, longer service life and higher sensitivity as compared with the conventional solid vibratory gyros, has a simple structure and a strong capability to resist against impact, and thus can be desirably applied to the field of the mid or low precision angular rate measurement.

What is claimed is:

1. A bell-shaped vibrator for an angular rate gyro, having a nonuniform thickness, axially symmetric and multi curved surface combined structure and comprising a bell shoulder, a bell waist and a bell lip connected from top to bottom successively, wherein:
   the bell shoulder has a hemispheric shell structure;
   the bell waist has a cylindrical shell structure; and
   the bell lip has a hyperboloidal shell structure.

2. The bell-shaped vibrator according to claim 1, characterized in that
   two excitation electrodes, two feedback electrodes, two detection electrodes and two damp control electrodes are evenly distributed circumferentially on an outer wall of the bell waist of the bell-shaped vibrator, and the two excitation electrodes, the two feedback electrodes, the two detection electrodes and the two damp control electrodes are distributed symmetrically about an axis of the bell-shaped vibrator respectively.

3. The bell-shaped vibrator according to claim 2, characterized in that
   an isolating hole is provided between every two adjacent electrodes among the two excitation electrodes, the two feedback electrodes, the two detection electrodes and the two damp control electrodes.

4. The bell-shaped vibrator according to claim 2, characterized in that
   Each of the two excitation electrodes, the two feedback electrodes, the two detection electrodes and the two damp control electrodes has the following dimensions: a length of 8 mm, a width of 2 mm and a thickness of 0.2 mm.

5. The bell-shaped vibrator according to claim 3, characterized in that
   the isolating hole has a diameter of 2 mm.

6. A bell-shaped vibrator type angular rate gyro comprising a bell-shaped vibrator, a vibrator fixing shaft, a vibrator base, an airtight hood, a housing and a circuit system, wherein the bell-shaped vibrator has a nonuniform thickness, axially symmetric and multi curved surface combined structure and comprises a bell shoulder, a bell waist and a bell lip connected from top to bottom successively, wherein:
   bell shoulder has a hemispheric shell structure;
   the bell waist has a cylindrical shell structure; and
   the bell lip has a hyperboloidal shell structure.

7. The bell-shaped vibrator type angular rate gyro according to claim 6, characterized in that
   two excitation electrodes, two feedback electrodes, two detection electrodes and two damp control electrodes are evenly distributed circumferentially on an outer wall of the bell waist of the bell-shaped vibrator, and the two excitation electrodes, the two feedback electrodes, the two detection electrodes and the two damp control electrodes are distributed symmetrically about an axis of the bell-shaped vibrator respectively.

8. The bell-shaped vibrator type angular rate gyro according to claim 7, characterized in that
   negative pole faces of the two excitation electrodes, the two feedback electrodes, the two detection electrodes and the two damp control electrodes are fixedly attached to the bell-shaped vibrator by means of a conductive adhesive,
   positive pole faces thereof are connected with metal leading wire which are bonded to respective connecting holes in the vibrator base by welding,
   eight pairs of capacitor pole plates are connected to respective connecting holes above a central shaft of the vibrator, and
   the bell-shaped vibrator type angular rate gyro which has been assembled is sealed by the airtight hood, connected to an external circuit via connecting terminals, and connected to an integral housing via a mechanical mounting hole.

9. A method for controlling a bell-shaped vibrator in a piezoelectric manner, wherein the bell-shaped vibrator has a nonuniform thickness, axially symmetric and multi curved surface combined structure and comprises a bell shoulder, a bell waist and a bell lip connected from top to bottom successively, wherein:
   the bell shoulder has a hemispheric shell structure;
   the bell waist has a cylindrical shell structure; and
   the bell lip has a hyperboloidal shell structure,
   two excitation electrodes, two feedback electrodes, two detection electrodes and two damp control electrodes are evenly distributed circumferentially on an outer wall of the bell waist of the bell-shaped vibrator, and the two excitation electrodes, the two feedback electrodes, the two detection electrodes and the two damp control electrodes are distributed symmetrically about an axis of the bell-shaped vibrator respectively,
   the method for controlling the bell-shaped vibrator in the piezoelectric manner comprises:
   exciting the bell-shaped vibrator to produce four-wave loop vibration using the two excitation electrodes on the outer wall of the vibrator;
   when an applied angular rate causes a counterclockwise rotation around the symmetrical axis of the bell-shaped vibrator, causing a standing wave to process in a reverse direction so as to form a precession angle; and
   detecting vibrating effect of the standing wave through the two feedback electrodes and the two detection electrodes on the outer wall of the bell-shaped vibrator using piezoelectric effect so as to realize control of the vibration forms of the vibrator.

10. A method for measuring an angular rate, comprising:
    controlling a bell-shaped vibrator type angular rate gyro in a piezoelectric manner, wherein the bell-shaped vibrator type angular rate gyro comprises a bell-shaped vibrator, a vibrator fixing shaft, a vibrator base, an airtight hood, a housing and a circuit system,
    the bell-shaped vibrator has a nonuniform thickness, axially symmetric and multi curved surface combined structure and comprises a bell shoulder, a bell waist and a bell lip connected from top to bottom successively, wherein:

the bell shoulder has a hemispheric shell structure;

the bell waist has a cylindrical shell structure; and the bell lip has a hyperboloidal shell structure, two excitation electrodes, two feedback electrodes, two detection electrodes and two damp control electrodes are evenly distributed circumferentially on an outer wall of the bell waist of the bell-shaped vibrator, and the two excitation electrodes, the two feedback electrodes, the two detection electrodes and the two damp control electrodes are distributed symmetrically about an axis of the bell-shaped vibrator respectively, negative pole faces of the two excitation electrodes, the two feedback electrodes, the two detection electrodes and the two damp control electrodes are fixedly attached to the bell-shaped vibrator by means of a conductive adhesive, positive pole faces thereof are connected with metal leading wire which are bonded to respective connecting holes in the vibrator base by welding, eight pairs of capacitor pole plates are connected to respective connecting holes above a central shaft of the vibrator, the bell-shaped vibrator type angular rate gyro which has been assembled is sealed by the airtight hood, connected to an external circuit via connecting terminals, and connected to an integral housing via a mechanical mounting hole;

exciting the bell-shaped vibrator to produce four-wave loop vibration using the two excitation electrodes on the outer wall of the vibrator;

when an applied angular rate causes a counterclockwise rotation around a symmetric axis of the bell-shaped vibrator, causing a standing wave to process in a reverse direction so as to form a precession angle;

detecting vibrating effect of the standing wave through the two feedback electrodes and the two detection electrodes on the outer wall of the bell-shaped vibrator using piezoelectric effect so as to realize control of the vibration forms of the vibrator; and causing mass points in planes of capacitor pole plates to produce a displacement by the precession of the standing wave, thus causing capacitor pole plates on an inner wall of the bell-shaped vibrator to change, and detecting the displacement using the eight pairs of capacitor pole plates together to obtain the applied angular rate based on a linear relationship between the displacement and the applied angular rate.

11. The bell-shaped vibrator type angular rate gyro according to claim 7, characterized in that an isolating hole is provided between every two adjacent electrodes among the two excitation electrodes, the two feedback electrodes, the two detection electrodes and the two damp control electrodes.

12. The bell-shaped vibrator type angular rate gyro according to claim 7, characterized in that each of the two excitation electrodes, the two feedback electrodes, the two detection electrodes and the two damp control electrodes has the following dimensions: a length of 8 mm, a width of 2 mm and a thickness of 0.2 mm.

13. The bell-shaped vibrator type angular rate gyro according to claim 11, characterized in that the isolating hole has a diameter of 2 mm.

* * * * *